United States Patent
Kim

(10) Patent No.: US 12,268,965 B2
(45) Date of Patent: Apr. 8, 2025

(54) INTERACTIVE TALK GAME SYSTEM AND METHOD

(71) Applicant: KSEEK Co., Ltd., Daejeon (KR)

(72) Inventor: Young-real Kim, Daejeon (KR)

(73) Assignee: KSEEK Co., Ltd., Daejeon (KR)

( * ) Notice: Subject to any disclaimer, the term of this patent is extended or adjusted under 35 U.S.C. 154(b) by 0 days.

(21) Appl. No.: 18/939,546

(22) Filed: Nov. 7, 2024

(65) Prior Publication Data

US 2025/0058230 A1 Feb. 20, 2025

Related U.S. Application Data

(63) Continuation of application No. PCT/KR2024/003329, filed on Mar. 18, 2024.

(30) Foreign Application Priority Data

Mar. 22, 2023 (KR) ........................ 10-2023-0037186

(51) Int. Cl.
*A63F 13/67* (2014.01)
*A63F 13/35* (2014.01)

(52) U.S. Cl.
CPC .............. *A63F 13/67* (2014.09); *A63F 13/35* (2014.09)

(58) Field of Classification Search
CPC ................................. A63F 13/67; A63F 13/35
See application file for complete search history.

(56) References Cited

U.S. PATENT DOCUMENTS

| 2012/0246580 A1* | 9/2012 | Bouverat | G06Q 50/01 |
| | | | 715/753 |
| 2015/0297981 A1* | 10/2015 | Kim | A63F 13/80 |
| | | | 463/9 |
| 2017/0266542 A1* | 9/2017 | Schwarck | A63F 13/792 |

FOREIGN PATENT DOCUMENTS

| KR | 10-0817100 B1 | 3/2008 |
| KR | 10-2009-0128828 A | 12/2009 |
| KR | 10-1575779 B1 | 12/2015 |
| KR | 10-2018-0000141 A | 1/2018 |
| KR | 10-2020-0019353 A | 2/2020 |

OTHER PUBLICATIONS

WIPO, International Search Report issued for International Application No. PCT/KR2024/003329, Jun. 18, 2024, 4 pages.
KIPO, Notice of Refusal to Grant a Patent for Application No. 10-2023-0037186, May 3, 2023, 11 pages.
KIPO, Decision to Grant a Patent for Korean Patent Application No. 110-2023-0037186, Sep. 13, 2023, 11 pages.

* cited by examiner

*Primary Examiner* — Thomas H Henry
(74) *Attorney, Agent, or Firm* — Nicholas Park

(57) ABSTRACT

Disclosed are an online talk game method and system in which a plurality of users interacts and match composition rates by sharing opinions. A server unit announces a talk topic and receives and announces opinions of the users. The server unit receives the user's answer to the question and the expecting rate, calculates the composition rate of the answer, and determines that the smaller a difference between the composition rate and the user's expecting rate, the more advantageous it is, and the larger the difference, the more disadvantageous it is. This talk game can provide an interactive game that allows users to become immersed when a large number of users participate in the talk game, and (Continued)

prevent many ties, prevent collusion between the users, and reduce user confusion.

15 Claims, 6 Drawing Sheets

ID,965 B2
INTERACTIVE TALK GAME SYSTEM AND METHOD

CROSS-REFERENCE TO RELATED APPLICATION

This application is a U.S. Bypass Continuation Application of International Application No. PCT/KR2024/003329, filed on Mar. 18, 2024, which claims priority to and the benefit of Korean Patent Application No. 10-2023-0037186, filed on Mar. 22, 2023, the disclosure of which is incorporated herein by reference in its entirety.

BACKGROUND

Field of the Invention

The present invention relates to a talk game system and method in the form of a quiz that requires guessing a rate value in a talk event where many people participate at the same time and share their individual opinions on a specific topic in real-time. In addition, the present invention relates to a system and method for providing a talk-based quiz game that allows users to share their own opinions with opinions of others on a talk topic using a user unit and to more accurately guess the composition rate of people's answers through interaction with many people.

More specifically, the present invention relates to an interactive talk game system including a server unit formed to present, through user units, a question related to a talk topic with multiple options with respect to a plurality of users, receive a user's opinion from the user unit and notify of the received user's opinion to the user unit or a notice unit 400 that can be viewed by many people to share the received user's opinion with other users, receive a selected answer to the question from the user unit, receive an expecting rate for the answer from the user unit, calculate a composition rate of each answer from a plurality of pieces of answer information received from a plurality of user units, determine the score or correct answer of each user by comparing the expecting rates received from the user units of the plurality of users, and determine ranks the users based on the scores which they have obtained; and a user unit configured to receive the question related to the topic from the server unit, output the question so that the user can view the question, transmit an opinion input by the user on the question to the server unit, receive opinions of the other users from the server unit and output the opinions of the other users so that they can view the opinions of the other users, transmit an answer selected or input by the user among the choices for the question to the server unit, transmit an expecting rate input by the user for the answer to the server unit, and receive a value for a voting result and the user's score or ranking information from the server unit, and a method for providing an interactive talk game for the user unit and the server unit.

Discussion of Related Art

Conventional technologies in this field include online voting systems or survey systems.

Another technology in this field is an interactive broadcasting service that helps multiple users participate in voting and conduct a talk show in which the voting results are used to continue the conversation.

Still another technology in this field is a quiz game service where multiple users simultaneously participate in quizzes and points are awarded for correct answers and eliminated from the quiz game for incorrect answers.

SUMMARY

In 2014, Korean broadcasting system (KBS) aired a live program called "Follow Me" where many viewers participated in real-time voting on talk topics using their smartphones, and the talk show was held based on the voting results. In the first episode, over 25,000 viewers voted on five dilemma quizzes related to the talk topics, and in the second episode, over 38,000 viewers voted on the five dilemma quizzes related to the talk topics.

In this TV program, viewers were asked a question with two options, such as "If you could ride a time machine, would you go to the past or the future?" or "If you were born again, would you be born a woman or a man?". The viewers selected one of the options on their smartphones and input their answers. The server unit received the answers in real-time from viewers' smartphones, and the answer chosen by the majority was deemed a correct answer. Each viewer's answer was scored accordingly, and the viewer with top score finally received a prize.

This TV program was a talk show, covering about 5 topics for 60 minutes and consisting of questions related to each topic. In order for a broad audience to easily understand the topics and participate in the broadcast, each question had only 2 possible options.

However, since tens of thousands of viewers participated in this broadcast, there was a problem with many tied scores due to the small number of scoring stages. This problem was solved by giving more points to viewers who answered quickly, but there was still a possibility that many people could gather together and press buttons as fast as the number of cases to intentionally create a first place winner who would receive a large prize.

In other words, with five talk topics, each with two options, 16 people could win first place regardless of their individual skills by quickly pressing the buttons according to the number of cases.

This fundamental problem remained unresolved even when the number of dilemma quizzes increased to 6, as a group of 32 people could still coordinate to secure the first-place prize. In addition, due to the characteristics of the talk show that requires sharing opinions of many people within a limited time of about an hour that people can concentrate, there is a limit to including more topics for discussion.

Another problem with the above-described approach is the trap of adverse selection. This method of determining the answer with the largest number of responses as the correct answer and grading each viewer's answer causes people to not consider their own thoughts. Rather than choosing an answer that reflects their own opinions, they end up choosing an answer that many people are likely to choose in order to get points. Because of this, the results of real-time voting reflect viewer' expectations about the correct answer rather than their opinions.

To resolve this, a method was devised to ask two consecutive questions with the same options. That is, the first question is asked to the viewers on their smartphones, "Input your thoughts on the following options," and then the second question is presented to the users, "Which option do you think will receive the most votes?".

This method attempted to resolve the problem of reverse selection by transmitting the answer reflecting the user's intention and the answer reflecting the user's prediction to the server unit, and the server unit used the first answer to calculate the voting result and used the voting result to determine the second answer. However, when this method was implemented, viewers started to collude.

There was an incident where many viewers colluded to unconditionally select only No. 1 for every question, and this collusion made it difficult to proceed with the talk show because the results of all votes were unreliable as the talk game was repeated several times.

In this method, there were many criticisms that it was confusing for users to consecutively present two questions with the same options in the discussion structure and have them input answers.

The present invention seeks to solve the problem of many tied first place winners, the problem of adverse selection, the problem of collusion, and the problem of confusion in the above-mentioned talk show structure.

According to an aspect of the present invention, there are provided a user interaction-based talk game system and a method thereof, in which a game system is configured to send a question including a plurality of options to a plurality of user units of a plurality of users, receive each user's opinion from the plurality of user units, announce the user's opinions by transmitting the user's opinions to the plurality of user units or a notice unit 400, receive a plurality of answers and expecting rates to the question from the user units, calculate a composition rate for each answer from the plurality of answers received from the plurality of user units, determine that a higher score is given when a difference between the expecting rate received from each user unit and the composition rate of the answer is smaller, and a lower score is given when the difference is larger, and reflect a result of the determination on a game by sending the result of the determination to the user unit, reflecting the result of the determination on ranking information of the user, or adding or subtracting the score of the user, and a user unit is configured to transmit and receive data with a server unit using a network means, receive the question including the plurality of options from the server unit, transmit a user's opinion related to the question to the server unit, receive and output opinions from the plurality of users from the server unit, provide a means for the user to input an answer and an expecting rate to the question, send the user's answer and the expecting rate to the server unit, receive and output information on the composition rate from the server unit, and receive and output a determination result or ranking information.

According to another aspect of the present invention, there are provided a talk game system and method, in which the talk game system includes a notice unit configured to output, by a server unit, user opinions received from a plurality of user units, receive, by the server unit, a composition rate calculated from user answers and output the received composition rate using an output device, and output a determination result or a ranking result, and an operating unit configured to instruct the server unit to send a question to the user unit, complete the reception of an answer to the question and the expecting rate, and instruct the server unit to compare and determine the expecting rate of each user with the composition rate and reflect the determination in a game.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
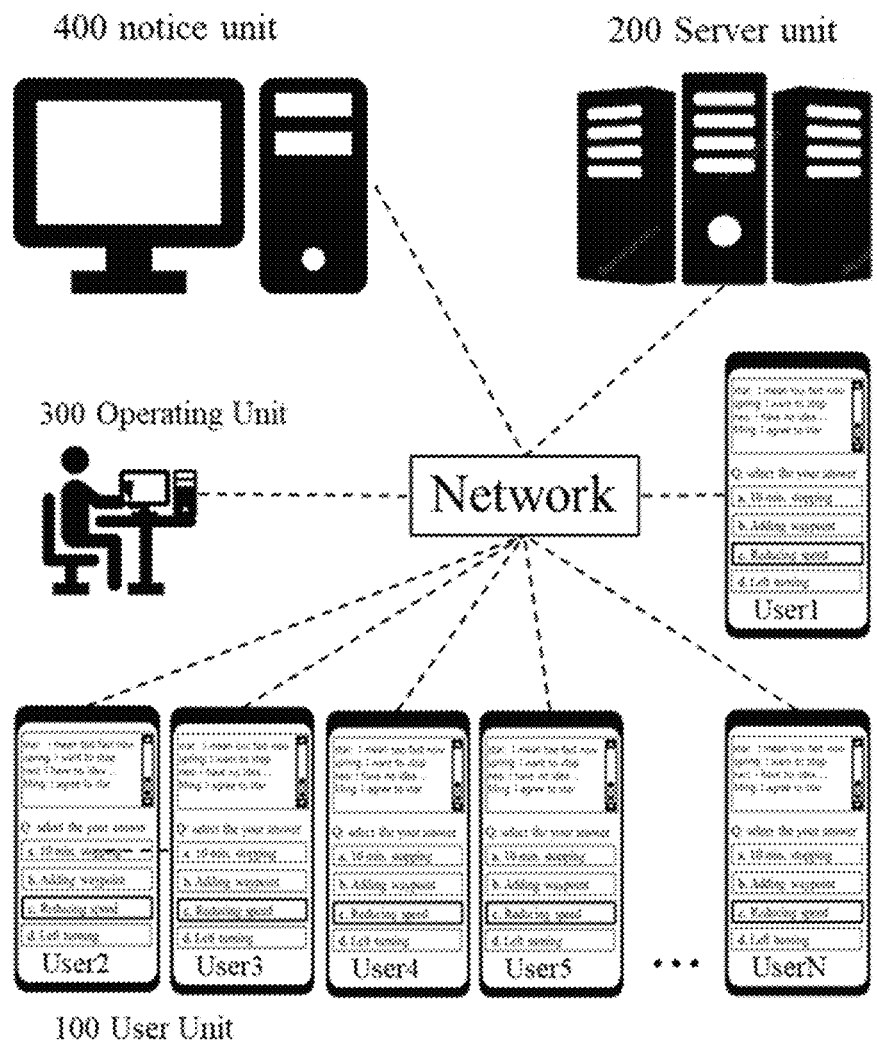
FIG. 1 is a schematic diagram illustrating a network of an interactive talk game.

Terms used in this specification are described as general terms currently used in consideration of the functions mentioned in the present invention, but they may mean various other terms depending on the intention of a technician working in the field, court precedents, or the emergence of new technologies. Therefore, the terms used in this specification should not be interpreted solely based on the name of the term, but should be interpreted based on the overall content of the present invention that the term has.

Terms used in this specification are used only to describe specific embodiments, and are not intended to limit the present invention. Singular expressions include plural expressions unless the context clearly indicates otherwise.

In addition, when a component is said to be "connected" or "coupled" to another component, it may be directly connected to or coupled to another component, but it should be understood that other components may be present therebetween.

The expression of "transmitting or receiving data from or to" means not only transmitting or receiving data by data communication between directly connected devices or modules, but also transmitting or receiving data through other equipment or modules.

In addition, throughout the specification, server units, units, etc., are formed as software for operating electronic systems in physically existing electronic systems, and even if a server unit or unit is used singly, the server unit or unit can be formed by being connected multiple systems as needed to perform the intended function.

Throughout the specification, the term "question" refers to a question such as a choice question with multiple options or an open-ended question without options. The term "question" may be a question without a correct answer, or a question that can be scored as a correct answer. In addition, throughout the specification, "question" does not mean a question uttered directly by a person, but rather means question data that allows answer data to be input through a user unit, and may consist of, but is not limited to, text data, image data, and voice data.

Throughout the specification, the term "answer" refers to a value selected or input by a user using a user unit from multiple options for the question, which is transmitted to the server unit as the user's answer to the question, and the server unit is used to calculate a composition rate of answers or options from a plurality of answers of a plurality of users. In addition, throughout the specification, "answer" does not mean an answer that a person directly speaks, but rather means answer data input through a user unit for question data output through the user unit, and may consist of text data, image data, and voice data, but is not limited thereto.

Throughout the specification, "opinion" refers to data input as a user's opinion in a talk game in relation to the question, and is announced to cause interaction between users according to the talk topic.

The user's opinion on the question includes various forms of messages that reflect the user's intentions input through an electronic unit and are converted into data, and are distinguished from those input as formal answers, and include dataification of the user's assertions, simple statements (sayings), chats, gestures, etc., in response to the question.

The "answer" or "opinion" may be input in various forms such as text, numbers, images, voices, and sounds, and managed in the form of digital data or transmitted to a server unit or unit, and may be converted into other forms of data as needed.

Throughout the specification, "option" refers to an option provided as a choice when a question on a talk topic is a multiple choice question. The composition rate of a specific option can be used in the same sense as the composition rate for the same answer as the specific option. For open-ended questions without options, only the composition rate for user answers can be considered.

Throughout the specification, "composition rate" refers to the rate of answer of users as a result of vote for a question. The composition rate is a value calculated as a rate for each answer from multiple users' answers. For questions with options, the composition rate for the option refers to the composition rate of the answer that is the option value.

For a question without option, there can only be a composition rate per answer. "Composition rate" can be an individual value for a composition rate per option or answer in the server unit, or can be a plural meaning that includes multiple composition rates per option or answer.

The composition rate is calculated as a rate of each answer to the answers received from multiple users. The composition rate of a specific answer is treated the same as the composition rate of the same option as the answer in the case of multiple-choice questions. The composition rate can also be expressed as a part of the sum of the composition rates of multiple answers. The composition rate can be applied as percentage, thousandth, ten thousandth, tenth, etc.

When only one answer per user is validly processed, the sum of the composition rates for the answers will be 1, but when the user selects or inputs multiple answers, the sum of the composition rates may exceed 1.

The composition rate can be applied to a single answer or multiple answers, and for questions with correct answers, the composition rate can be the rate for an incorrect answer or correct answer.

Throughout the specification, "expecting rate" refers to an expected value input into a user unit 100 to match the composition rate calculated for each option or answer to a question. In addition, "expecting rate" also refers to a value input by the user to match the composition rate. The expecting rate can be input as a number such as tenth, percentage, thousandth, ten thousandth, etc.

Throughout the specification, "forecasting rate" refers to a composition rate predicted by the server unit through data analysis. Analysis target data may be data listed on SNS, portal sites, or blogs, but corresponds to data from people who are not closely related to users participating in the talk game. The analysis target data for the server unit to calculate the forecasting rate may be the opinions of users participating in the talk game.

Throughout the specification, "correct answer range" refers to a range in which the user's expecting rate can be recognized as a correct answer. Since the answers of users may be different, the correct answer range applied to each user may be applied differently.

Throughout the specification, the forecasting rate, composition rate, and expecting rate can be expressed as values of percentage, thousandth, ten thousandth, etc.

Throughout the specification, "game operation" refers to a format that includes operations of notifying multiple users of questions, exchanging opinions, and calculating a composition rate from the answers to determine the expecting rates of the multiple users.

Throughout the specification, "notice" refers to a process in which a server unit transmits data to be notified to multiple electronic units capable of transmitting and receiving data over a network.

In the present invention, a talk game is formed in such a manner that people synchronously participate in multiple game operations based on a separate channel, announce the final ranking or the final first place after completing the multiple game operations, and then end the talk game.

Throughout the specification, "channel" is a unit of a game system that is operated independently for users to participate and play a talk game. Multiple users participating in a single channel share their opinions based on questions over several game operations, and compete to gain the most points or become the final survivor.

When multiple channels are present at the same time, the operating units are connected and used separately for each channel, and the talk game is conducted for each channel by dividing the game operation into separate channels containing separate questions.

Hereinafter, an embodiment of the present invention will be described with reference to FIG. 1. FIG. 1 is a schematic diagram illustrating a configuration of a network connected with a server unit 200, a user unit 100, a notice unit 400, and an operating unit 300 for implementing the present invention. In the specification, the user unit 100, the notice unit 400, the operating unit 300, etc., are collectively referred to as units, and are specialized to use the corresponding functions only when necessary for operating the talk game, and the server unit is constantly powered on so that it can support the talk game by operating the channel at any time according to the users' purpose, and is operated in an environment where a stable network is provided.

The present invention is formed in such a manner that a plurality of user units 100 and a server unit 200 are connected to transmit and receive data through a network means such as the Internet. In addition, the operating unit 300 may be further included and formed, and a notice unit 400 may be further formed.

The user unit 100 is expressed in a manner of conveniently assigning numbers in order, such as User1, User2, User3, User4, and User5, and "N" in User N is not a specific number but rather any of many numbers. A situation where thousands, tens of thousands, or hundreds of thousands of user units for participation transmit and receive data to and from the server unit via the network is assumed.

The server unit 200 is formed in such a manner that an OS such as Linux, Unix, or MS Windows, etc., is installed and driven and software is executed by a web-based or server unit daemon.

The server unit 200 may further include a DB system for storing and managing various types of data, and transmit and receive data to and from unit devices such as the user unit 100, the operating unit 300, and the notice unit 400 using a communication method such as a transmission control protocol (TCP) or user datagram protocol (UDP).

The server unit 200 may be formed in such a manner that various systems are arranged in a distributed manner and linked together using technologies such as blockchain to perform the function of the server unit 200 in the present invention.

The software that performs the function of the server unit 200 may be written in a programming language such as C or C++, and in the case of web-based software, the software may be written in language elements such as JSP, PHP, Java script, and HTML.

The user unit 100 includes a user unit and software that performs functions of the user unit. The user unit 100 may be formed by installing dedicated software on a device designed to independently perform functions of the user unit.

In order to allow more people to participate, the user unit 100 may be configured to execute application software that performs a unit function on a device such as a mobile phone, a smartphone, a tablet PC, or a laptop PC.

The user unit 100 outputs data sent by the server unit for notice directly to a display or speaker or to an output device connected by Bluetooth, etc.

The user unit 100 includes a network means such as local area network (LAN), Wi-Fi, Bluetooth, wired/wireless device, etc., and includes an output module such as a display or speaker that outputs data transmitted from the server unit 200.

The user unit further includes an input module such as a camera, a keyboard, a touchpad, a microphone, a digital pen, etc.

The user unit 100 does not need to be provided with all the same functions to all users. Some users may be provided with a unit that is formed focusing on a microphone so that they can input opinions or answers as voice data, but does not have a display or output function, and some users may be provided with a unit equipped with a microphone, a display, a touchpad, a speaker, etc.

In a more extensive sense, the user unit 100 may be formed as a digital broadcasting system including a PC, multiple microphones, and multiple cameras. The user unit 100 is not limited to any format as long as the user unit 100 meets the criteria for inputting opinions, answers, or expecting rates for questions.

Figure 2:
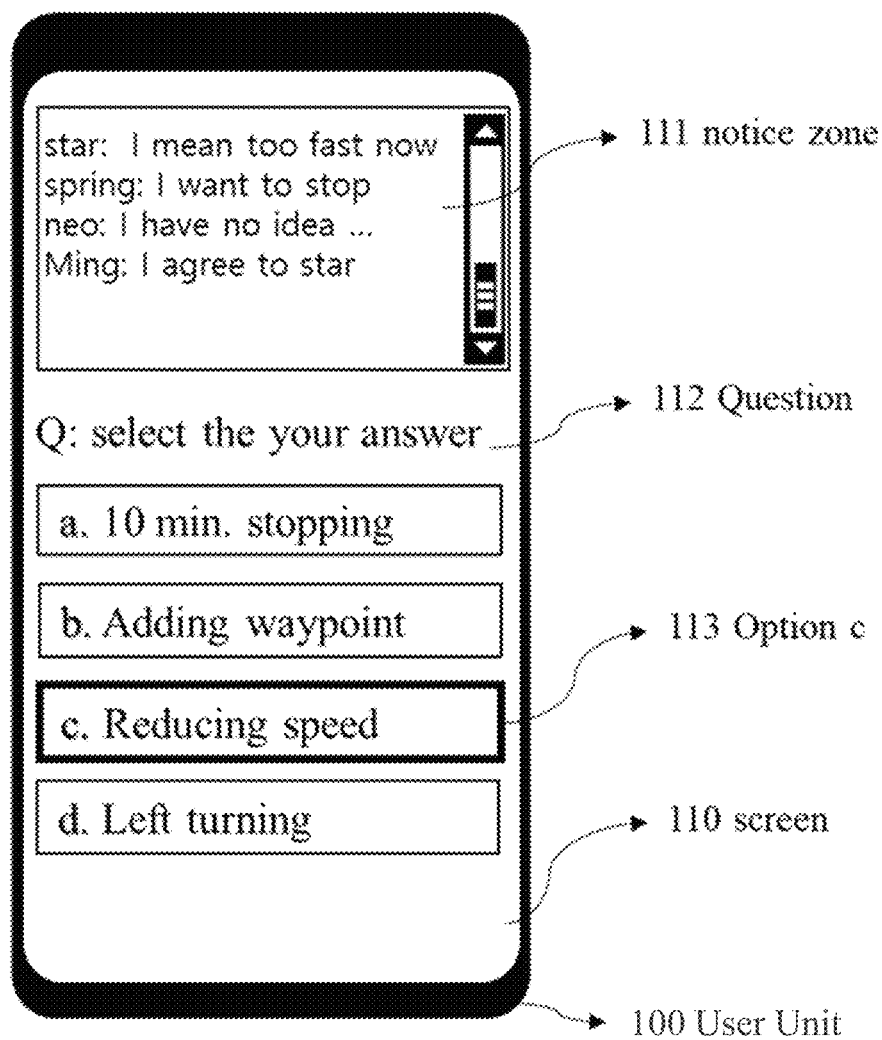
FIG. 2 is a schematic diagram illustrating a user unit.

In FIG. 2, the user unit is a smartphone equipped with a screen 110, and the screen area is divided into a notice zone 111, a question 112, an option c 113, etc., and arranged in a software manner.

The operating unit 300 is configured to perform the function of the operating unit by executing software that performs the function of the operating unit on a unit such as a laptop PC, a smartphone, PC, or a tablet PC.

Figure 3:
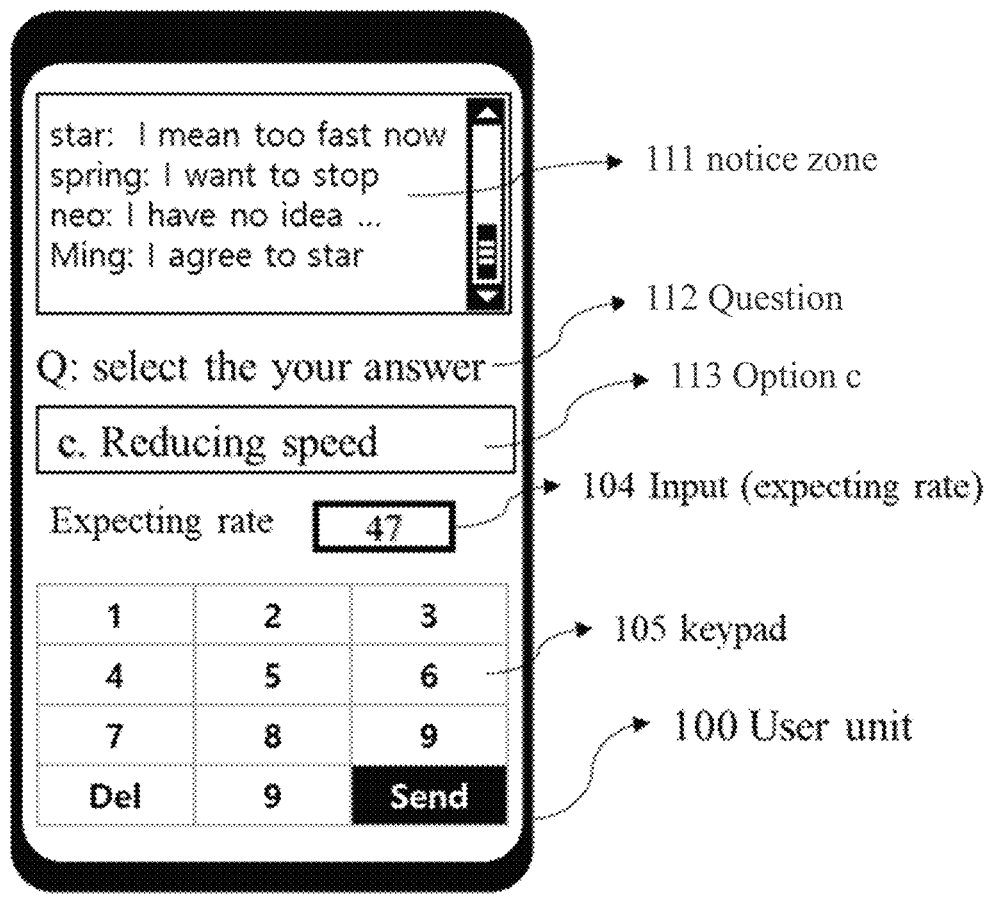
FIG. 3 is a schematic diagram illustrating a case in which an expecting rate is input through a user unit.

In FIG. 3, a user unit in another state is shown. FIG. 3 illustrates an example in which a user inputs an expecting rate 104 with a keypad 105. In FIG. 3, input is made as a value consisting of numerical values. A touchpad for voice recognition through a microphone or handwriting input is provided, and when a user inputs handwriting on the touchpad, an image is transmitted to the server unit or converted into text and transmitted to the server unit.

The operating unit 300 transmits a command containing various types of information to the server unit according to the operator's input. That is, in order to open a new channel for an event, a channel opening command including the channel title, maximum number of participants, an image symbolizing the channel, and information on prize payment is transmitted to the server unit.

The operating unit 300 defines the protocol of the operating unit and the server unit to control the game progress of the server unit by transmitting commands required for the talk game to the server unit according to the operator's request, and configures each processor.

The operating unit and the server unit may constitute the structure of the server unit's function execution method for transmitting operating unit commands in such a manner that the functions related to the overall management of the talk game are divided into detailed categories, such as allowing or blocking user entry into the event channel, announcing questions, starting to receive answers, ending to receive answers, starting to receive opinions, announcing opinions, blocking to receive opinions, calculating the composition rate, starting to receive expecting rates, ending to receive expecting rates, evaluating expecting rates, awarding points, drawing prizes, announcing prize winners, accumulating scores for each user, announcing rankings, etc., and the divided functions can be carried out by the operator's commands.

The server unit 200 opens or closes a channel and notifies users of channel information such as a channel status, the current number of participants, prize contents, and a title.

The server unit 200 provides game operations to the user by implementing the game operations including announcing questions to the users included in the channel, receiving opinions on the question or stopping receiving the opinions, receiving answers to the question, stopping receiving the answers, calculating the composition rate for the answer, and determining the expecting rate of each user.

In addition, the operating unit 300 transmits a command to the server unit to cause the server unit to calculate the composition rate from the received answer or to notify information on the composition rate.

In addition, the operating unit 300 transmits, to the server unit, commands for operations such as closing a channel, awarding prizes by rank, announcing reward information, selecting prize winners among the correct answers for each question, or announcing information.

The server unit 200 selects users who satisfy the cumulative ranking conditions, personal information conditions, personal experience conditions, answer ranking conditions, final ranking conditions, correct answer conditions, and score conditions, as prize draw targets.

The server unit 200 selects prize recipients by conducting a draw among users eligible for prizes. The operating unit 300 enables the conditions for the prize draw to be included in the prize draw command and sends this to the server unit.

When receiving the prize draw conditions from the operating unit, the server unit 200 draws the prize winners in consideration of the conditions and announces the results of the draw or the conditions of the draw.

The operating unit 300 may transmit command information including additional conditions related to the determination to the server unit.

When determining the score of each user for a question with a correct answer, the server unit 200 may determine the score of a correct answerer or designate the user as a target of the prize draw. In addition, the expecting rate of the user is determined using a correct answer rate as the composition rate of the correct answer, or the expecting rate of the user is determined using the composition rate of an incorrect answerer.

As an example of transmitting a determination command including a composition rate condition for each answer with respect to the expecting rate to the server unit when determining the user's expecting rate, the operating unit transmits command information to the server unit to determine the correct answer with respect to the expecting rate within a designated correct answer range, such as 5%, 10%, or 20% around the composition rate, or to determine the score by allowing the user to designate whether a relative score granting method will be a quadratic equation or a linear equation.

The notice unit 400 is a unit that displays announcement-related materials from the server unit by a large number of users. The notice unit 400 is formed to execute software on a hardware device such as a smartphone, a tablet PC, a laptop, etc., which performs the announcement function.

The application software that enables the notice unit 400, the operating unit 300, and the user unit 100 to perform their respective functions is developed in a language that allows application development, such as C, Kotlin, Swift, Object C, Java, Visual basic, and C #.

The notice unit 400 enables a web browser to operate each function, and the web browser is equipped to download HTML, JavaScript, etc., from the server unit and operate each function.

When the web-based notice unit 400 is provided, it is possible to download and use software composed of JavaScript from the web server unit by executing a general-purpose web browser without installing separate dedicated software, thereby encouraging participation from people who are reluctant to install dedicated software.

Figure 4:
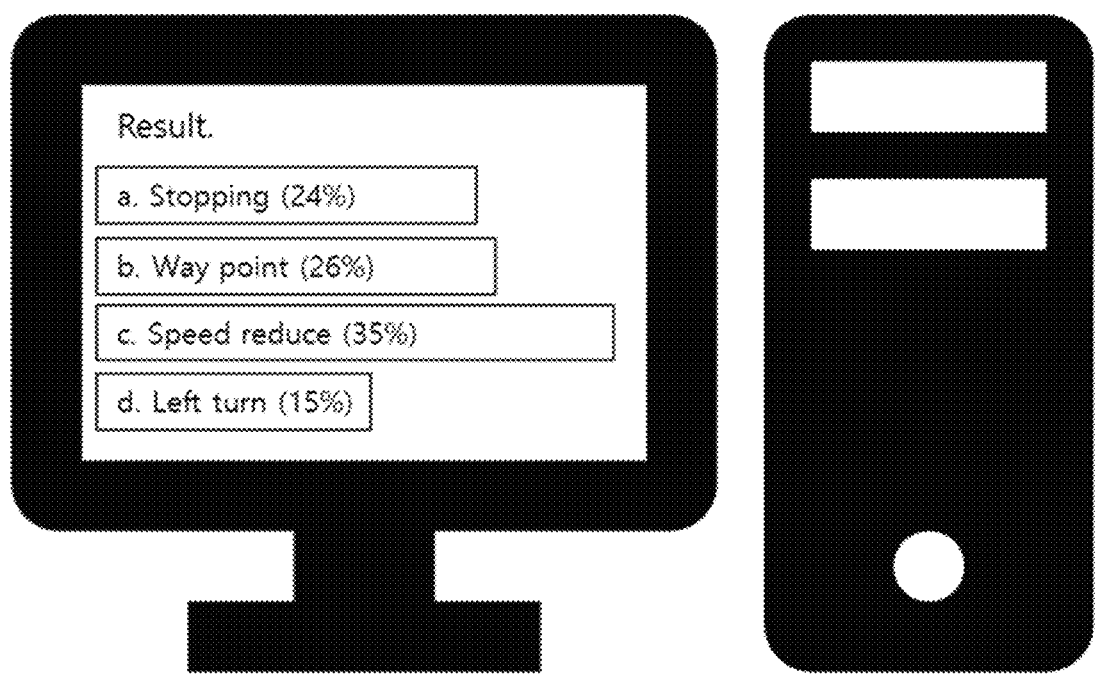
FIG. 4 is a schematic diagram illustrating a notice unit.

FIG. 4 shows an example of a PC-based notice unit 400. In this example, the output of the notice unit 400 is displayed on a monitor, but the output thereof can be transmitted to a video output device such as a projector through a unit such as a high-definition multimedia interface (HDMI), and the output unit can be changed and set so that the output can be transmitted to another computer or broadcasting system.

In the embodiment of the present invention, the server unit outputs notice data directly to an HDMI unit, and the notice unit 400 can also be configured to receive and output the notice data in an HDMI format as a video output device such as a projector.

The server unit receives a command from the operating unit 300, holds an event, notifies users of the fact that the event has been held so that they can access the event, and maintains, when users enter the event, a state in which data can be transmitted and received while continuously distinguishing each connection to the user unit in TCP or UDP mode.

The server unit is configured to transmit, to the notice unit 400 or the user unit 100, data for opening an event, setting a new question, closing the reception of answers to a question, calculating the composition rate of answers for each option, calculating the ranking, announcing the ranking, starting the reception of opinions, closing or announcing the reception of opinions.

The server unit 200 receives information on answers to questions, opinions, and expecting rates from the plurality of user units 100.

In a method for the server unit 200 to receive the answers to questions or the expecting rates from the plurality of user units 100, the user unit transmits the answer or expecting rate directly input by the user to the server unit and the server unit receives the answer or expecting radio from the user unit.

The server unit 200 may be configured to receive signals by dividing the answers and expecting Rates from the user unit into specific times. That is, the server unit may alternately announce the answers or conduct a talk, and designate the corresponding answer with respect to the user unit that transmits a signal during the corresponding time frame.

In addition, the server unit 200 may make an announcement by gradually increasing the expecting rate to 10%, 20%, 30%, etc., the user unit may receive a signal input and transmit the received signal to the server unit, and the server unit may receive the signal by specifying the expecting rate announced at the time of receiving the signal as the expecting rate of the corresponding user.

It is desirable for the server unit to receive the answer or expecting Rate directly, but when the server unit receives specific data separately by time frame as above, the server unit may convert the received specific data into data of the answer or expecting rate by considering the time frame in which the specific data was received.

The server unit may also receive the answers by designating the answers by distinguishing the time at which data such as the user's opinion or expecting rate is received. This method can also be applied to the method of receiving the user's expecting rate.

The server unit 200 calculates the composition rate for each answer, determines the expecting rate received from each user unit 100 for multiple users, and announces the result of the determination, or reflects the determination result on the user's score or talk game and announces the reflection result, or creates and announces ranking information.

The server unit 200 and the user unit 100 are provided with a user login method for convenient service.

The user unit transmits the user's ID and password to the server unit and receives the login result. When the user transmits data to the server unit by receiving an authentication key for maintaining the login, the authentication key is transmitted so that the service suitable for the user's authority can be available.

The user unit additionally transmits personal information such as the user's phone number, email, name, sex, location, birthday, and academic background.

The server unit 200 receives the user's ID and password from the user unit 100, transmits the user's login result information to the user unit 100, and generates an authentication key for maintaining login and transmits the authentication key to the user unit.

The server unit 200 receives personal information such as the user's email, phone number, sex, location, birthday, and academic background from the user unit, and stores the received data using a DB module or data storage device.

The operating unit is provided with server unit and operating unit services so that a user with operator authority can use the operating unit after logging in.

The server unit 200, the user unit 100, the operating unit 300, and the notice unit 400 can be formed identically without distinction for users who provide opinions on questions, users who provide answers, and users who more accurately match the expecting rate, or formed separately.

In a talk game that is conducted in real-time, multiple users may input answers and expecting rates together using user units and send the input data to the server unit, or an operation of calculating the composition rate of the answers by the command of the operating unit may be performed after the user's expecting rate is received. That is, it is desirable to secure the confidence that the composition rate for the answer is completely blocked from being leaked before the user inputs the expecting rate.

The server unit 200 calculates the composition rate for each answer as the rate of the number of respondents for each answer to the number of users who are the target of the composition rate.

The server unit 200 may store user's selection or data using a DB module, and by analyzing the stored data, the server unit 200 may analyze user preferences or examples of opinions or answers used in the previous events.

The server unit may calculate the composition rate by limiting the target group based on personal information such as the user's sex, age, location, etc. When the operating unit instructs to calculate the composition rate of each answer by targeting only unmarried women of Korean nationality in their 20s, the server unit divides users corresponding to unmarried women in their 20s by each answer and calculates the composition rate of the target group.

The server unit calculates the composition rate by limiting the target group based on the user's participation history, such as the user's preferences, or examples of opinions or answers.

When the operating unit instructs the user who answered "Busan" in a second question to answer the composition rate of a third answer, the server unit calculates the composition rate for the third answer only for the users who answered "Busan" in the second question.

The server unit may calculate the composition rate by cross-referencing the user's information and the user's preferences or information related to the user's participation history. The composition rate is calculated only for women in their 20s who answered "Busan" in the second question.

The server unit divides the users into teams and calculates the composition rate by team.

The server unit announces question information or user intentions, etc., to users with limited conditions based on personal information, participation history information, or teams.

When the server unit 200 calculates the composition rate, the composition rate information required to express multiple graphs in a form that is easy to compare by age group or sex is transmitted to the notice unit 400 or the user unit, whereby a notice is made. In response to this, the notice unit 400 or the user unit receives the composition rate information required for the multiple graphs from the server unit, and converts the received information into a graph and outputs the converted result.

The server unit may obtain the types of the answers received from the plurality of users, count the number of respondents for each answer, and divide the number of users who answered each answer by the number of the multiple users to obtain the composition rate for each answer.

The server unit 200 may calculate the composition rate by considering the multiple answers with similar meanings as one answer in terms of the type of answer.

The user unit 100 is provided with an input device that allows the user to input opinions, answers, expecting rates, etc., in various forms such as voice, video, and text, or supports the input device that can be connected to the user unit.

The user unit transmits digital data such as video, voice, and image text directly to the server unit, or converts the form of the data and sends the converted result, as needed.

The user unit 100 may convert voice into text or compress voice and transmit the converted or compressed data to the server unit, and convert the corresponding data into a symbolic value (sadness, laughing, noise, silence, etc.) in the video and transmit the converted data to the server unit, or transmit digital image data to the server unit in a streaming mode.

The server unit 200 considers the user's opinion that has received from the user unit in text format as relatively less important, and transmits the corresponding opinion directly to another user unit 100 or the notice unit 400.

When the server unit 200 needs to share opinions in the form of materials with a large amount of data, as in a streaming method such as voice or video, it is necessary to distribute the load of the server unit by implementing a separate server unit dedicated to streaming or transmitting the corresponding data using a means such as a content delivery network (CDN).

In response to a method in which the server unit 200 transmits the data for announcement using streaming, the notice unit 400 or the user unit 100 executes a function to receive the data for announcement and output the received data to be exposed to the user.

The notice unit 400 and the user unit 100 may output the data transmitted by the server unit for announcement through a screen or speaker or transmit the data to an external device connected via Bluetooth HTMI, etc., and thus the user can recognize the data. The server unit 200 receives a command from the operating unit 300, and organizes the user's answers according to the command to calculate the composition rate of the options or answers. The composition rate of the answers or options is determined as numerical values of percentage, thousandth, ten thousandth, etc.

The server unit 200 calculates the composition rate for each answer by counting the number of respondents for each answer for the multiple answers received from the user unit and dividing the number of respondents for each answer by the number of users targeted for the composition rate. The users targeted for the composition rate may be the total number of respondents or the number of users targeted for the response.

The server unit 200 calculates the composition rate of each answer for multiple answers, or calculates the composition rate of answers, which is referred to as the rate of correct answers or the rate of incorrect answers for questions with correct answers.

The server unit 200 calculates the composition rate to have a value from 0 to 100 or less in the case of a percentage, and to have a value from 0 to 1000 or less in the case of thousandth.

The server unit 200 compares the expecting rate received from each user unit 100 with the composition rate calculated by the server unit, determines that a larger score is given when a difference between the expecting rate and the composition rate is smaller, and determines that a smaller score is given when the difference is larger.

Figure 5:
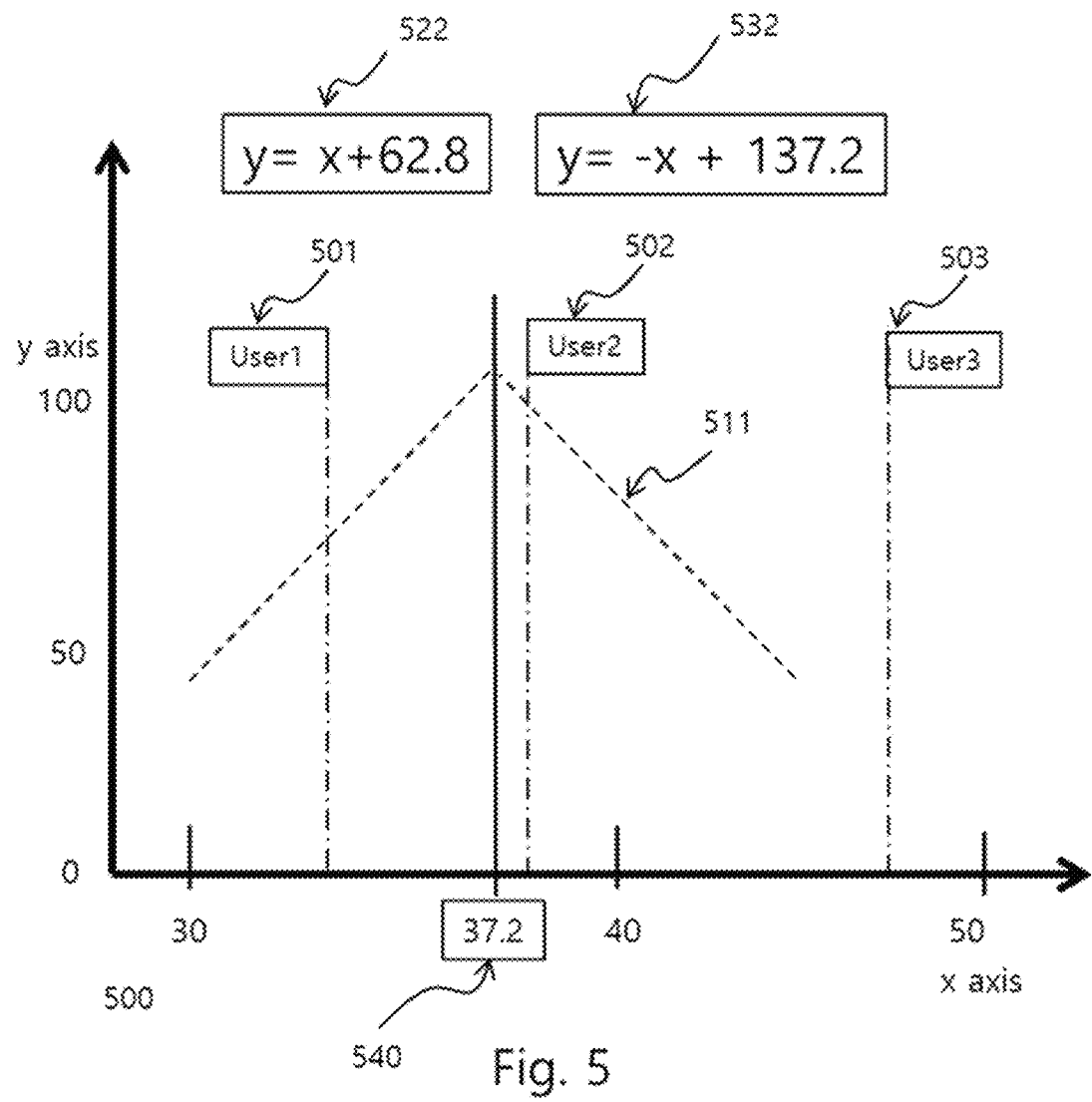
FIG. 5 is a linear function determination graph.

It is desirable for the server unit 200 to follow certain rules when determining the user's score, and FIG. 5 shows a linear scoring method for determining scores. It is desirable for the server unit to be provided with various scoring algorithms and it is desirable for the scoring algorithms to be differently applied depending on the purpose.

Hereafter, a method in which the server unit 200 determines the user's score linearly will be described with reference to FIG. 5. The composition rate that the server unit uses as the determination criterion 540 is 37.2. For user 1 who input a value equal to less than 37.2 for each answer input by user 1, user 2, and user 3, a y value obtained by substituting the expecting rate input by user 1 into x of a function 522 is determined as the score of user 1, and for user 2 and user 3 who input the values of user 2 and user 3 into x of a function 532, each resulting y value is determined as the scores of user 2 and user 3.

In FIG. 5, in a case in which the user's expecting rate is calculated, 92.8 points are calculated when the user's expecting rate is 30 and function 522 is applied, and 97.2 points are calculated by function 532 when the user's expecting rate is 40. In addition, when the user's expecting rate is 50, it becomes 87.2, and the greater the difference between the expecting rate and the composition rate is, the lower the score is given.

To determine the user's score by differentiating the foresight of people participating in the talk game, a more favorable result is given to a person who inputs the composition rate and the more accurate expecting rate.

Figure 6:
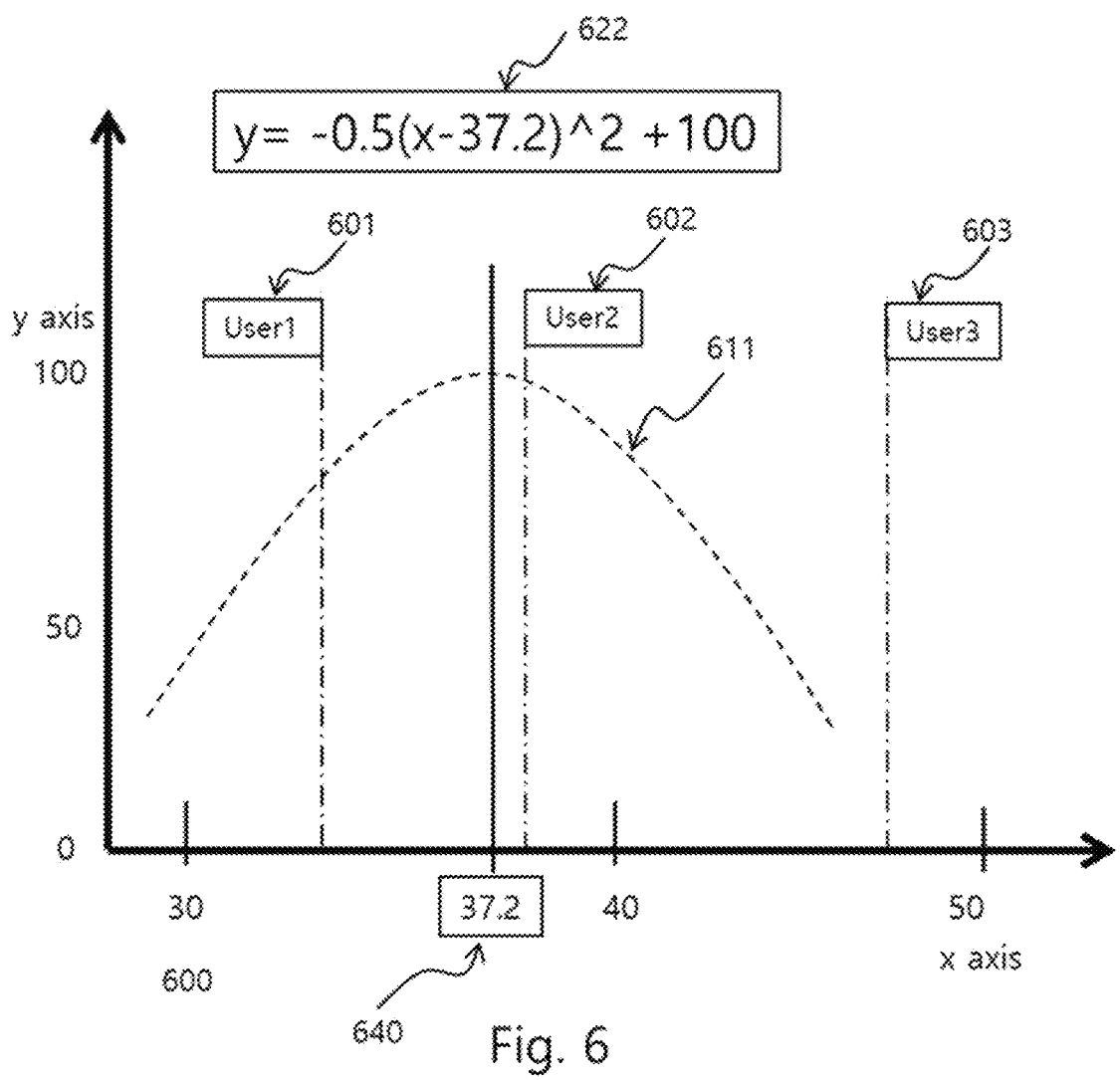
FIG. 6 is a quadratic function determination graph.

In a case in which the score is determined by the user again in FIG. 6, when the user's expecting rate is 30, the score is calculated as 74.08 by function 622. When the expecting rate is 40, the score is calculated as 96.08, and when the expecting rate is 50, the score is calculated as 18.08.

When determining the user's expecting rate in FIG. 6 as the score, the user's expecting rate is calculated differently from it in the example of FIG. 5, but it can still be seen that the larger the difference between the expecting rate and the composition rate is, the lower the score is given, and the larger the difference is, the more the score drops.

In a case where the server unit performs the determination, the calculated score can be determined by rounding off or deleting the decimal point.

Graph 511 indicated by the dotted line in FIG. 5 shows expected values of evaluation scores of people for the expecting rate of users corresponding to the x-axis.

FIG. 6 shows a method by which the server unit calculates the value for each user's expecting rate as a quadratic function, and shows the score according to the expected value as a graph. Graph 611 indicated by the dotted line shows expected values of evaluation scores for each user's expecting rate.

In FIG. 6, the server unit determines the score of each user based on the composition rate of the answer or option of 37.2. The server unit 200 inputs the expecting rate of each user into an x value of function 622, and determines the result value, y, as the user's score.

The meaning that the server unit determines the expecting rate of each user to have a numerical value differentially according to the difference between the composition rate and the expecting rate for multiple users refers to a method of reflecting favorable scores for users who did not accurately match the composition rate but answered an expecting rate close to the composition rate, and giving different scores according to the degree of closeness to the composition rate.

The server unit 200 implements an operation of differentially determining the corresponding scores by giving meaningful positive or negative values even to users who input inaccurate expecting rates, but giving different scores when the difference between the expecting rate and the user's composition rate is different.

Another example of the server unit differentially determines the scores according to the difference between the expecting rate and the composition rate is a method of giving different scores according to the order of the differences.

The scores may be determined by arranging users who input expecting rates for the same answer according to the difference between each expecting rate and the composition rate and marking the rankings of the users, and assigning scores according to a difference in the ranking.

As to the method of differentially assigning scores according to the difference between the user's expecting rate and composition rate, the server unit sets a certain category and assigns points in a first method that limits the number of users, such as 100 and 2000, and give points to the users or recognize them as correct, a second method that limits users to a rate of 10% or 20% of the users with the same answer, and give points or recognize them as correct, or a third method that limits users to a rate of 10%, 20%, 30% of the total participants, and give points or recognize them as correct, etc.

The server unit 200 may also determine the score in another method. That is, the server unit 200 may determine the score by giving 50 points to a person whose user expecting rate satisfies a range of 2%, 40 points to a person whose user expecting rate satisfies a range of 2% to 10%, and 20 points to a person whose user expecting rate satisfies a range of 10% to 20%.

As to the difference between the composition rate and the user's expecting rate, the server unit 200 may also be designed in such a manner that 100 points are given in a first section of less than 2%, 80 points are given in a second section of 2% or more to 4% or less, 50 points are given in a third section of 4% or more to 5%, 60 points are given in a fourth section of 5% or more to 6% or less, and 40 points are given in a fifth section of 6% or more to 10%.

In this case, the third section with a small difference can be seen as a more disadvantageous score than the fourth section, but except for the third section, since it is more advantageous as the expecting rate is closer to the composition rate, the users try to guess the composition rate as accurately as possible.

The server unit may give points only to users who input the expecting rate within the correct answer range for the composition rate, make the users correct, or designate the users as targets of a prize draw. For example, when the correct answer range is set within around 5% of the composition rate, the server unit may give points only to users who input the expecting rate within 32.2 to 42.2, make the corresponding users correct, draw the corresponding users for the prize, or designate the corresponding users as targets of a prize draw.

In order to add fun to the talk show, the server unit 200 may apply the correct answer range of the cliff concept to determine the score. That is, in a game where the composition rate for a specific answer needs to be more accurately matched, when the composition rate that needs to be matched is 37.2, the expecting rate exceeding 37.2 is treated as an incorrect answer, a disadvantageous score is given, or the corresponding user is eliminated from the next game operation.

When the server unit 200 determines the score in this cliff method, people tend to carefully determine and input the expecting rate so as not to use a value that is even slightly higher than the correct answer, and a large score may be given to those who boldly input a value expected to be close to the correct answer despite the risk, thereby providing a more exciting gamification element.

In applying the cliff method, the server unit 200 selectively applies the cliff method to each problem for users who input the expecting rate that exceeds the correct answer or for users who input the expecting rate that is below the correct answer.

The composition rate used by the server unit to determine the user's expecting rate is usually the composition rate of the user's answer. In this way, the value of the composition rate evaluated for each user can be different when the answer input by the user is different. In this case, the composition rate is the composition rate of the same option as the user's answer and the user's expecting rate is determined.

The user may easily infer the expecting rate for the answer he/she selected, but it may be difficult to infer the expecting rate for the answer he/she did not select.

The server unit 200 inputs the expecting rate for the user's answer, and determines the expecting rate of the user as a score based on the composition rate of the user's answer, determines the corresponding expecting rate as the correct/incorrect answer, designates the corresponding user as a target for a prize draw, or designates the user as a target for a prize draw.

To help you understand, examples of a hypothetical question, the number of respondents per answer, and an answer input by a specific user will be described.

Question: Choose your favorite alphabet (Options: A, B, C, D)

Total respondents: 100 (User 34's answer: A, User 35's answer: C, User 73's answer: A)

Number of users by answer, where the number in parentheses indicates the number of people: A (10), B (30), C (40), D (20)

Here, since the number of users who are the target of composition rate calculation is 100, the composition rate for each answer is calculated as the same value as the number of users who submitted answers when the composition rate is calculated as a percentage.

The server unit 200 uses 10, which is the composition rate of answer A for the expecting rate value of user 34, as the determination criterion composition rate, and uses 40, which is the composition rate of answer C that is the evaluation criterion for user 35 who inputs C as the answer, as the determination criterion composition rate.

When determining the user's expecting rate, the server unit determines the user's expecting rate in such a manner that the user supports a panel who participates in the discussion as a speaker and inputs the expecting rate for the panel, and compares the user's expecting rate with the composition rate of the panel's answers to determine the user's expecting rate.

In response to this, the server unit and client further include a procedure for allowing the user to select more support panels. A first method is possible, such as having the client input more support panels, or a second method is possible, such as assigning a talk time to each panel while the server unit is conducting a talk game, and distinguishing users who answered the answer or expecting rate according to the assigned time as supporting the corresponding panel.

The server unit can apply the present invention more deeply by calculating the support rate for each panel separately and determining the user's expecting rate based on the support rate of the panel, or determining the user's expecting rate based on the composition rate of the answer answered by the panel.

The server unit may determine that only users who input the expecting rate of 51 for the answer with respect to the composition rate of 51 are correct or given 100 points. In this case, since the probability of getting the correct answer is 1 in 100, most users may feel defeated by not getting the answer right or not getting points, thereby reducing their willingness to continue participating in the game.

The server unit determines each user's expecting rate as correct or incorrect by applying a wide correct answer range so that more users can be recognized as correct or receive points.

The server unit determines the user's expecting rate as the score based on a predetermined correct answer range, or receives the correct answer range from the operating unit and determines the user's expecting rate.

In a case in which the correct answer range is 10, the server unit 200 determines that users who input the expecting rate of 41 or more and 61 or less are correct or give favorable scores when the evaluation criterion composition rate is 51. In this way, people can exhibit their foresight and produce more correct answers.

The server unit 200 may perform determination that is advantageous to users who submitted the expecting rate within the correct answer range in such a manner that the server unit 200 gives points to users who input the expecting rate within the correct answer range of the composition rate, and does not give points or rather reduces the score of the user who input the expecting rate outside the correct answer range.

The server unit 200 calculates and determines the scores by calculating the difference between the composition rate and the expecting rate for each user, and gives a smaller score to the user as the difference is larger, and gives a larger score to the user as the difference is smaller, so that it is advantageous to the person who inputs the expecting rate close to the composition rate.

For composition rate of 51 for the answer, the server unit 200 gives 100 points to a user who inputs 51 as the expecting rate, 75 points to a user who inputs 56 or 46 as the expecting rate, and 50 points to a user who inputs 61 or 41 as the expecting rate, and proportionally determines the scores for values between 41 and 61 through calculation.

The server unit 200 determines the score based on a certain correct answer range or the correct answer range designated by the operating unit, thereby allowing the number of correct answerers to be adjusted according to the game operation purpose.

For example, the server unit 200 may designate the maximum score that can be obtained from each question as 10 points, 100 points, 1000 points, and 10000 points, and change the score criteria, the correct answer range value, and the weight within the correct answer range each time each game question is conducted.

It is preferable that the server unit 200 compares the user's expecting rate received from the user unit 100 and determines the expecting rate based on the composition rate for the answer received from the same user unit 100.

In the case of a discussion game where the composition rate for a specific answer or option other than one's own answer is to be guessed, the server unit 200 accurately expresses and announces the composition rate that must be guessed, and determines the expecting rate of all users to be determined based on the composition rate for the specific answer or option.

The server unit 200 may calculate the composition rate by limiting users who meet certain conditions, such as personal information such as the user's residence, sex, and age, or the user's experience information such as the answer input at a certain question stage, and evaluate the user's expecting Rate.

In this case, the server unit 200 should notify the user unit 100 or the notice unit 400 of the corresponding content, thereby guiding the users to input the expecting rate with considering the limited conditions.

As the discussion game progresses, it is very important to encourage those who initially had difficulty in obtaining points to participate in the discussion until the end of the game. For this reason, the server unit is formed in such a manner that the score criteria are gradually raised as the game operations are repeated, or the range of correct answers is gradually narrowed or reversed, the operating unit 300 transmits a command including additional conditions to the server unit, and the server unit applies the additional conditions and proceeds with the game operation according to the received command.

The server unit 200 provides participants with a discussion that can interact on various topics in a certain section while having a discussion over a number of game operations of about 5.

Each game operation has at least one question corresponding to the topic of discussion, the server unit sequentially performs functions such as essential question disclosure, opinion reception, opinion announcement, answer reception, expecting rate reception, composition rate calculation, and expecting rate determination for the game operation, and the server unit transmits the data to the server unit 200 when users input answers, expecting rates, opinions, etc., to questions into the user unit 100.

The server unit 200 should only process user opinions or answers that are related to the question in preparation for a talk game in which many people participate. That is, due to network instability or failure, there may be a question that arrived at the client 10 minutes ago, but a talk game may currently proceed with a new question in the server unit.

In a case in which the server unit 200 proceeds with the talk game by assuming the user's answer or opinion to the previous question when transmitting the user's answer or opinion to another question, inaccurate information will be provided to the user.

The server unit 200 notifies the client of the question by including a serial number or unique key through which the question for each question can be identified, and the client transmits an identification code of the question to the server unit when transmitting opinions, answers, and expecting rates.

The server unit may prevent confusion and incorrect determination of users due to network failures by determining or notifying only valid contents of the user's opinions, answers, and expecting rates received from the user unit.

The server unit selects the ranking by score for each question, or repeatedly performs operations of question announcement, opinion reception, opinion announcement, answer reception, calculating the composition rate of the answer, determining the expecting rate for multiple users, and accumulates the scores and eliminations for each user and calculates the user's ranking or determines whether the user will finally survive.

The server unit may select a winner based on cumulative scores or for each question, or select the final survivor. The final winner is determined by the cumulative scores and the information is announced.

The server unit may announce ranking information for each game operation when a talk game including multiple questions is in progress, and announce accumulated ranking information. The server unit may announce data by transmitting notice data to the notice unit 400 or the user unit 100. Specifically, the server unit announces information such as options, questions, the start and end of each game operation, the progress status of each game operation, ranking information for each game operation, survivors for each game operation, dropouts for each game operation, composition rate for each game operation, determination results for each game operation, cumulative ranking or final ranking.

The server unit is configured to automatically proceed with a discussion game for several operations based on its own conditional determination, or to receive step-by-step detailed commands from the operating unit and operate according to the conditions of the specific commands.

The server unit 200 or the operating unit 300 is formed to increase the score criteria for each question by 500 points, 600 points, 700 points, and 800 points. In addition, the correct answer range is formed to decrease by 30%, 20%, 10%, and 5% for each question.

The operating unit 300 transmits a determination command including the score criteria and correct answer range to the server unit each time, or transmits the entire score criteria and correct answer range to the server unit in batches for each round, so that the server unit determines the corresponding score for each round.

The server unit may be designed to automate some or all thereof. The server unit receives commands from the operating unit for each section and transmits data related to opening and closing the event and questions to the user unit in accordance with each command, or announce the user's opinion by transmitting the user's opinion that arrived from the user unit to the notice unit 400 or the user unit 100 in response to an announcement command.

The server unit may additionally receive and store information about the user or the user unit from each user unit. Here, personal information such as the user's age, affiliation, sex, age, date of birth, address, etc., or the location information of the user unit or the Internet address accessed by the user unit, etc., are additionally received and stored.

The server unit receives user identification numbers such as ID and user passwords such as passwords from the user unit for the purpose of continuous use by the user, stores the received information in a storage device or DB module, and manages the stored information. The server unit additionally receives personal information such as age, sex, hometown, school, grades, and hobbies from the user, and records and manages the received information in the storage device.

The server unit provides a login procedure that verifies the user's identity using the user's identifier and password, and applies the user's opinion information or activity information, etc., to the calculation of the expecting rate by accumulating the user's opinion information or activity information in the logged-in user.

The server unit may open channels or bulletin boards related to the talk game and allow users to exchange opinions on related topics even when the talk game is not in progress.

The server unit may create and announce a schedule to be periodically provided for various talk channels, and includes a notice function for users who receive notices, push notices, text messages, etc., so that the users can receive information about their preferred channels.

It is desirable that the server unit transmit information required for the user's registration and login to the server unit, or operate with the user's authority at the time of logging-in.

The server unit may divide the users into several teams as needed. The server unit may determine the team scores by the number of correct answers or points earned by each team, calculate the final team rankings, and announce the calculated information.

When calculating the composition rate for determining the user's expecting rate, the server unit may calculate separate composition rates for only the corresponding users by limiting the team or region, and then use the composition rate to determine the user's expecting Rate.

The server unit may configure a talk game in which users participating in the talk game select a team "Yoo Jae-seok"

and a team "HaHa," send questions to the user units of 100,000 users, and have all the users guess the composition rate of the answers of the users belonging to the team of "Yoo Jae-seok." In addition, the talk game is conducted in which members of the team of "HaHa" have to guess the composition rate of the answers of the team of "Yoo Jae-suk."

The server unit 200 allows multiple channels to be opened at the same time and supports each talk game for multiple users on each channel.

In order for the server unit 200 to operate the talk game separated by channel, it is desirable to enable a separate operating console to respond to each channel, and enable the users to participate in the talk game by being included in only one channel at the same time.

The server unit 200 simultaneously operates multiple talk games on each channel by setting a separate ID to identify the channel with the content of the talk game, and allows the users to conduct the talk games consisting of separate questions by separating the users by channel ID.

When multiple talk games branched for each channel are conducted, the server unit 200 transmits information about the talk games to the user unit so that the users can select and enter the talk game. The information about the talk games may include the number of participating users, the average number of respondents, the channel ID, the title of the talk game, the operator, the performers, the panel, and information about prizes.

When receiving participation intention information including the user's channel ID from the user unit, the server unit designates the channel ID to the user unit, receives opinions, answers, and expecting rate values for questions related to each game operation of the talk game of the corresponding channel, and performs the overall functions of the talk show such as evaluating the users.

The user unit receives information about the channels in which each talk game is being conducted from the server unit, displays the received information on the display, and transmits, to the server unit, a command for allowing the user to enter the channel by referring to the corresponding ID when the user selects a channel he or she wants to enter.

The server unit 200 analyzes the user's opinion to calculate the expecting rate or classify the user's opinions into multiple groups. The server unit 200 may use an AI technique such as an unsupervised learning technique to classify the user's opinions.

The server unit 200 may classify the opinions based on the answers, such as opinions including words similar to the answers or opinions mentioned in the answers, and classify opinions into groups of opinions such as "agree," "disagree," or "neutral" using AI techniques such as unsupervised learning.

The server unit 200 classifies the user's opinions into several groups and selects some of the opinions corresponding to the groups as representative opinions and announces the selected opinions. At this time, the server unit 200 selects opinions that can clearly explain the characteristics of the classified groups without including profanity.

The server unit 200 has a function for the operating unit 300 that makes a notice according to an announcement command.

When the server unit 200 announces the user's opinion, the server unit 200 provides the opinion to the operating unit 300 and then announces the opinion data requested by the operating unit according to the operator's judgment.

The server unit 200 calculates distribution data for each user's expecting rate. The number of users who responded to each expecting rate is counted and formed as distribution data in the form of a table or array.

When the server unit 200 obtains the distribution data for the expecting rate, the server unit may obtain the distribution data by counting the number of users corresponding to each difference between the expecting rate and the composition rate.

The server unit 200 transmits the distribution data to the notice unit 400 or the multiple user units 100 to announce the distribution data.

The user unit 100 or the notice unit 400 receives the distribution data from the server unit, converts the distribution data into a distribution graph, etc., and outputs the converted result.

When the server unit 200 determines a representative opinion among the user opinions, the server unit determines the representative opinion by determining whether the spelling or meaning of the content is accurate and whether there are any vulgar words, etc. The server unit 200 may announce only the representative opinion so that multiple people can see it at the same time.

The server unit 200 classifies the notice data according to the user's participation history, the user's personal information, or the team, and transmits the notice data for the purpose of notice, thereby announcing the notice data.

When the server unit analyzes the user's opinion using an artificial intelligence (AI) technique and calculates the expecting rate, the server unit uses an AI function to determine the opinion data received from the user unit as positive or negative for each user.

In order for the server unit to perform machine learning to calculate the expecting rate with artificial intelligence (AI), when the user's opinion data is not text, the server unit converts the user's opinion data into text, analyzes the components of an operation of determining the meaning and morphological analysis of the text data, and performs a preprocessing process for learning, and then learns the data to complete the AI function.

The learning method for utilizing the AI function of data for calculating the expecting rate by the server unit 200 includes supervised learning, unsupervised learning, reinforcement learning, etc., and the necessary learning method is used according to the purpose and detailed background of determining the expecting rate.

After performing learning with AI, the server unit 200 determines what nuance the user who spoke the opinion data has, and based on this, calculates the expecting rates for all users participating in the talk game or some users who are the target of composition rate calculation.

The server unit 200 announces the opinion of a specific user in the game operation, additionally receives opinions from multiple users to determine whether the corresponding opinion is negative or positive, and calculates the preference of the multiple users with respect to the specific user.

At this time, the composition rate of the preference can be replaced with the composition rate of the user's answer corresponding to the preference, and the talk game can be conducted in such a manner that the user's expecting rate is determined.

The server unit further includes an operation of initiating and terminating an event of a specific channel. The server unit's initiation of the event of the specific channel includes a notice operation of notifying the multiple user units that an event of a new channel has been initiated.

The server unit receives information including the user's intent to participate in the channel event from the user unit, and quickly transmits data while maintaining a connection method such as TCP or UDP with the user unit of the user who has joined the channel.

The server unit may set an upper limit for the number of users in the channel. When the number of users exceeding the upper limit of the channel users is recruited, the server unit sends a notice that the channel entry is not possible to a new user who wants to join the channel.

The server unit may repeat operations of announcing questions about multiple talk topics to the multiple users participating in the specific channel, receiving questions or opinions, sharing opinions, receiving expecting rates, calculating composition rates, and determining users' expecting rates multiple times.

The server unit conducts the game on a large number of prepared talk topics for users who have participated in the channel, and announces the final ranking or the target of the prize.

The server unit additionally provides an operation of ending the channel event.

The server unit notifies users that the channel has been closed to prevent the users from entering the channel event, or removes the channel from the list of currently opened channels and announces the result. In addition, the server unit includes for disconnecting the users of the channel that was opened in relation to the operation of the channel, such as TCP or UDP, or for sending a signal to disconnect the user unit.

The server unit calculates the expecting rate for each option from the positive or negative expressions of people's opinions and transmits the calculated information to the operating unit 300 or announces the calculated information to the operating unit 300.

Additionally, the server unit 200 collects opinion materials posted by an unspecified number of people on SNS or the Internet related to the talk topic, classifies and analyzes the user's opinions for each option or answer, and announces the classified and analyzed opinions.

The server unit 200 includes a procedure for announcing data to be announced. The server unit announces data by implementing it to transmit data that needs to be notified to multiple users together to multiple user units or notice units.

The server unit 200 needs to separately perform operations of announcing a question for a single question, receiving and announcing an opinion, receiving an answer and an expecting rate, closing the reception of the answer and the expecting rate, and calculating the composition rate of the answer to determine the user's expecting rate.

The server unit has a filter function that determines whether the user's opinion contains socially inappropriate words or actions using AI and filters them out so that they are not announced to others. Even when AI is not used, in a case in which the user's opinion contains taboo words, the server unit performs an operation of filtering the taboo words on its own.

The server unit further include functions of announcing a question asking for the expecting rate so that the user can guess the forecasting rate obtained by AI techniques or the composition rate of the results of a specific survey that has already been concluded, determining the user's expecting rate as the forecasting rate, and reflecting or utilizing the determination result in the talk game.

The server unit selects representative statements from the opinion data of the multiple users or data collected from the Internet and announces the selected data, or transmits the selected data to the operating unit as a recommended notice article.

It is desirable to implement the server unit's selection of the recommended notice article by performing learning using AI techniques. The server unit analyzes the opinions of the multiple users, selects opinions that support or oppose the corresponding opinion for each option, and selects opinions that are spelled correctly, are not aggressive, and do not contain profanity.

The operating unit provides an input means for the operator to select a notice for the recommended notice article, and allows the operator to announce the recommended notice article for which the announcement command has been input through the server unit.

When collecting data from portal sites, news sites, blogs, SNS, etc., that exist as Internet sites, the server unit can collect data regularly or irregularly using a web data collection agent such as a robot agent.

According to the present invention, even when the game is conducted by asking about 5 questions in a row that are appropriate for the topic of the talk show, it is possible to prevent excessive ties for first place, prevent reverse selection on the topic of the questions, prevent collusion among many viewers, and reduce confusion among users.

According to the present invention, thousands or even tens of thousands of viewers can participate in an interactive discussion by sharing their opinions with each other on a talk topic, and an objective and clear gamification can be constructed for all participants, thereby allowing an interactive talk show or talk event to be held that allows for fun and serious concentration on the discussion and game.

Industrial Applicability

The technology of the present invention can be used in the industry for talk game broadcasts and events in which a large number of users participate, based on the premise of active exchange of opinions that enables interaction among a large number of users using smartphones. The applicant has been providing two-way broadcasting technology to EBS, KBS, etc., for many years, and is providing a platform necessary for the broadcasting industry based on precise technology that accurately supports broadcast composition, technology that considers the network environment of viewers, server unit performance, and network conditions. When the technology of the present invention is applied to the platform, high business performance can be expected.

DESCRIPTION OF REFERENCE NUMERALS

100: User Unit
104: Expecting Rate
105: Keypad
111: Notice Zone
112: Question
113: Option c
110: Screen
200: Server Unit
210: Database Module (DB Module)
220: Web Module
230: Service Module
300: Operating Unit
400: Notice Unit
500: Linear Score Calculation Graph
501: Expecting Rate of user1
502: Expecting Rate of user2
503: Expecting Rate of user3
511: Score Graph According to User Expecting Rates 522: Linear Function for Calculating Scores for Ratios Below Composition Rate
532: Linear Function for Calculating Scores for Ratios Above Composition Rate
540: Configured Ratio of Answers Used for Scoring of user1, user2, and user3
600: Quadratic Function-Based Score Calculation Graph
601: Expecting Rate of user1
602: Expecting Rate of user2
603: Expecting Rate of user3
611: Score Graph According to User Expecting Rates
622: Quadratic Function for Calculating User Expecting Rate Scores
640: Composition Rate of Answers Used for Scoring of user1, user2, and user3

What is claimed is:

1. An interactive talk game method, which is a method of providing an online event by using a server unit and a plurality of user units which transmit and receive data through a network, the interactive talk game method comprising:
announcing, by a server unit, a question including a plurality of options to a user unit or a notice unit;
receiving, by the user unit or the notice unit, the question from the server unit;
outputting, by the user unit or the notice unit, the question;
transmitting, by the user unit, an opinion input by a user to the server unit;
transmitting, by the user unit, an expecting rate input by the user to the server unit;
transmitting, by the user unit, an answer input by the user to the server unit;
receiving and announcing, by the server unit, the opinion;
receiving, by the server unit, the answer from each of the plurality of user units;
receiving, by the server unit, the expecting rate from each of the plurality of user units;
calculating, by the server unit, a composition rate of the answer with respect to the answer of each of the plurality of users;
determining, by the server unit, the expecting rate of each user to have a score differently for the plurality of users based on a difference between the expecting rate and the composition rate by comparing the expecting rate of each user with the composition rate of the answer; and
announcing, by the server unit, a result of the determining or ranking information of the user,
wherein the determining, by the server unit, of the expecting rate of each user to have the score includes favorably determining the expecting rate close to the composition rate of the answer.

2. The interactive talk game method of claim 1, wherein the determining, by the server unit, of the expecting rate of each user to have the score includes determining the expecting rate of the user using at least one of a first scheme in which the expecting rate of the user is determined to be a correct answer or an incorrect answer by applying a correct answer range, a second scheme in which the score of the expecting rate is calculated by applying the correct answer range, and a third scheme in which the user is determined as a target of a prize draw.

3. The interactive talk game method of claim 1, wherein the server unit repeatedly performs a game operation, which includes announcing a question, receiving an opinion, announcing the opinion, receiving an answer, calculating a composition rate of the answer, and determining an expecting rate for a plurality of questions, several times, the interactive talk game method further comprising:
initiating, by the server unit, a new game with respect to the plurality of users;
calculating the user's ranking by accumulating the scores for each user;
announcing, by the server unit, final ranking information; and
terminating, by the server unit, the game.

4. The interactive talk game method of claim 2, further comprising drawing, by the server unit, a prize for the plurality of users who responded with the composition rate of the answer and the expecting rate within the correct answer range.

5. The interactive talk game method of claim 1, wherein the determining, by the server unit, of the expecting rate of the user to have the score differently includes determining the expecting rate of the user to have a larger score when the difference between the expecting rate of the user and the composition rate is smaller and to have a smaller score when the difference is greater.

6. The interactive talk game method of claim 1, further comprising:
calculating, by the server unit, a forecasting rate by analyzing the opinion of the user; and
announcing, by the server unit, the forecasting rate.

7. The interactive talk game method of claim 6, wherein the calculating, by the server unit, of the forecasting rate by analyzing the opinion of the user includes calculating the forecasting rate by analyzing the opinion of the user participating in a talk game using an artificial intelligence (AI) technique.

8. The interactive talk game method of claim 1, further comprising classifying, by the server unit, opinions of the plurality of users into a plurality of opinion groups, and designating some opinions corresponding to the opinion groups as representative opinions of the opinion groups and announcing the designated opinions.

9. The interactive talk game method of claim 1, wherein the expecting rate of the user is an expecting rate for the answer of each user, and the determining, by the server unit, of the expecting rate of the user includes determining the expecting rate of the user by comparing the expecting rate of each user with the composition rate for the answer of each user.

10. An interactive talk game system, which is a system of providing an interactive talk game by using a server unit and a plurality of user units which transmit and receive data through a network, the interactive talk game system comprising:
a user unit connected to a server unit through a network means, and configured to receive a question including a plurality of options from the server unit, receive a user opinion, output the question and the user opinion, transmit an opinion input by the user to the server unit, transmit an answer input by the user to the server unit, and transmit an expecting rate input by the user to the server unit; and
the server unit configured to transmit a question including a plurality of options to a user unit, receive the opinion from the user unit and announce the received opinion to the user unit or a notice unit, receive the answer of the user from the plurality of user units and calculate a composition rate of the answer, receive the expecting rate of the user from the user unit, and favorably determine the expecting rate of the user close to the composition rate.

11. The interactive talk game system of claim 10, wherein the server unit initiates a talk game, conducts a plurality of talk game operations with respect to the plurality of users, calculates and announces a final ranking, and terminates the talk game.

12. The interactive talk game system of claim 10, further comprising the notice unit connected to the server unit through the network means and configured to receive and announce notice data from the server unit,
wherein the server unit transmits the notice data, such as questions and opinions, to the notice unit.

13. The interactive talk game system of claim 10, further comprising
an operating unit connected to the server unit through the network means and configured to transmit a talk game execution command to the server unit,
wherein the server unit receives a command related to talk game operation from the operating unit and executes the command.

14. An interactive talk game method, which is a method of providing an interactive talk game by using a server unit and a plurality of user units which transmit and receive data through a network, the interactive talk game method comprising:
announcing, by a server unit, a question asking for an expecting rate to a user unit or a notice unit;
receiving, by the user unit or the notice unit, the question from the server unit and outputting the received question;
transmitting, by the user unit, an opinion input by the user to the server unit;
transmitting, by the user unit, an expecting rate input by the user to the server unit;
receiving, by the server unit, the opinion from the user unit;
announcing, by the server unit, the opinion;
determining, by the server unit, the expecting rate of the user to have a larger score when a difference between a composition rate of an answer and the expecting rate of the user is smaller; and
reflecting, by the server unit, a result of the determining on user ranking information and announcing the ranking information.

15. The interactive talk game method of claim 14, wherein the server unit performs a game operation, which includes announcing the question with respect to the plurality of users, receiving and announcing the user opinion, and receiving and determining the expecting rate, a plurality of times, the interactive talk game method further comprising:
initiating, by the server unit, an event;
terminating, by the server unit, the event; and
announcing, by the server unit, final ranking information.

* * * * *